US006594608B1

(12) United States Patent
Averbuch et al.

(10) Patent No.: US 6,594,608 B1
(45) Date of Patent: Jul. 15, 2003

(54) METHOD FOR DETERMINING A FLEXIBLE PIPE STRUCTURE

(75) Inventors: Daniel Averbuch, Rueil-Malmaison (FR); Jean-Marc Leroy, Rueil-Malmaison (FR); Romain Lepoutre, Le Pecq (FR)

(73) Assignee: Institut Francais du Petrole, Rueil-Malmaison cedex (FR)

( * ) Notice: Subject to any disclaimer, the term of this patent is extended or adjusted under 35 U.S.C. 154(b) by 279 days.

(21) Appl. No.: 09/695,299

(22) Filed: Oct. 25, 2000

(30) Foreign Application Priority Data

Oct. 25, 1999 (FR) .............................................. 99 13403

(51) Int. Cl.$^7$ .......................... G06F 19/00; E21B 17/00
(52) U.S. Cl. ........................ 702/113; 702/34; 166/367
(58) Field of Search ................................ 702/100, 105, 702/113, 138, 170, 97, 33, 34; 73/152.43, 152.44, 152.45; 174/5 R, 55 B, 70 R, 110 R, 120 R; 166/341, 367

(56) References Cited

U.S. PATENT DOCUMENTS 4,357,067 A * 11/1982 Labbe et al. ................ 439/578
6,364,022 B1 * 4/2002 Kodaissi et al. ............ 166/367

FOREIGN PATENT DOCUMENTS

| EP | 0935207 | 8/1999 | ............ G06F/17/50 |
| FR | 2775050 | 8/1999 | ............ F16L/11/16 |

OTHER PUBLICATIONS

Langner, C. G. et al: "Code Conflicts for High Pressure Flowlines and Steel Catenary Risers", Proceedings of the 1997 29$^{th}$ Annual Offshore Technology Converence, OTC '97, PA (OF 4); Houston TX, USA, May 5–8, 1997—vol. 4, 1997, XP000900985, pp. 21–34 Offshore Technol Conf. Annu Proc; Offshore Technology Conference, Annual Proceedings 1997, O Technol Conf. Richardson, TX, USA.

* cited by examiner

Primary Examiner—Bryan Bui
(74) Attorney, Agent, or Firm—Antonelli, Terry, Stout & Kraus, LLP

(57) ABSTRACT

The present invention relates to a method for determining a flexible pipe meeting specifications and consisting of at least one of the following elements: a body (1), a sealed sheath (2), a pressure layer (3), a hoop (4), an armoring layer (6), an insulating material layer.

33 Claims, 3 Drawing Sheets

METHOD FOR DETERMINING A FLEXIBLE PIPE STRUCTURE

FIELD OF THE INVENTION

The present invention relates to a fast method for determining a flexible pipe structure or a list of structure families meeting determined specifications, for constituents of the structure industrially available and organized in databases.

DESCRIPTION OF THE PRIOR ART

The present invention relates to flexible pipes referred to as unbonded pipes according to the API RP 17B (Second Edition, Jul. 1, 1998) standard or to the API Spec. 17J standard. These standards, mentioned here by way of reference, explicitly describe the constituents of such a flexible pipe structure. The constituents considered here are all the constituents which take part, directly or indirectly, in the mechanical resistance and the thermal insulation of the flexible pipe during the laying operation and/or while it is used. The following constituents are mentioned: the body, the pressure layer, the hoop, the armors, the sheaths. Insulating materials can also be taken into account.

It is well-known that the combination of all above referenced structural elements involves complex calculations, notably because of the mechanical interdependences of each element. It is therefore advantageous to have a fast tool allowing examination of all the combinations of elements forming a flexible pipe meeting the specifications. Various solutions can thus be compared and classified according to various objectives: the lightest structure, the least expensive, the easiest to transport, the quickest to manufacture, etc.

SUMMARY OF THE INVENTION

The present invention thus relates to a method for determining a flexible pipe meeting specifications and consisting of at least one of the following elements: a body, a sealed sheath, a pressure layer, a hoop, an armoring layer, an insulating material layer. The method includes:

a) recording the data of the specifications corresponding mainly to the conditions of use and to the laying and manufacturing conditions of a pipe, b) making up databases concerning each one of the constituents of the pipe, c) performing all the combinations consisting of at least one of the elements of the group: body, pressure layer, hoop and sheath, defined in the data bases so as to form partial structures at least in accordance with the geometry of the pipe imposed by the specifications, d) eliminating the combinations which do not meet the external pressure resistance imposed by the specifications, e) determining for each combination from step d) the thickness and the armoring angle of the armors, and f) classifying the combinations according to a determined criterion.

In the method, the geometry imposed in step c) can be the inside diameter of the pipe.

After step c), it is possible to keep only the combinations whose weight per unit of length is in accordance with that imposed by the specifications.

Step e) can be carried out by taking account of a calculated insulant thickness.

Step e) can be carried out from all the types of armoring wires selected from the corresponding database.

The combinations can be classified according to at least one of the following criteria: the weight per unit of length, the cost, the outside diameter, the safety coefficient at operating pressure, the collapse pressure, the maximum setting depth, the suspended weight when laid.

The databases used in step c) can be restricted to specific types of elements so as to limit the number of combinations.

BRIEF DESCRIPTION OF THE DRAWINGS

Other features and advantages of the present invention will be clear from reading the description hereafter of a non limitative example, with reference to the accompanying drawings wherein.

DETAILED DESCRIPTION OF THE PREFERRED EMBODIMENTS

Figure 1A:
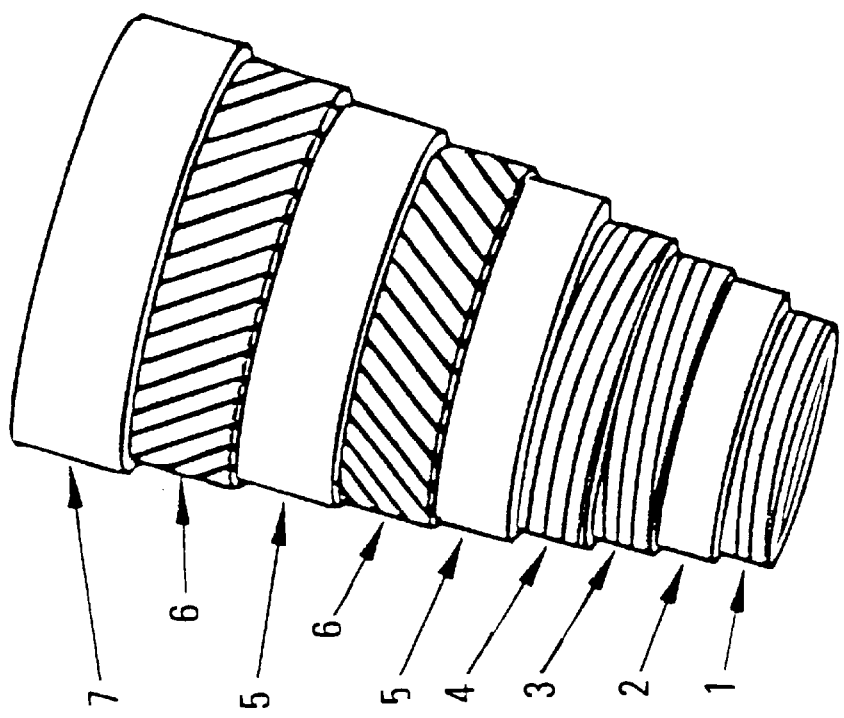
FIGS. 1a and 1b show the architecture of the flexible pipes which are the object of the present invention.

The principle of the method according to the invention was translated by a computer program wherein the input parameters are to be divided into two distinct categories. The first category relates to the specifications defining the technical problem to be solved:

1) Selection of the technical field:

flexible pipe referred to as flowline, i.e. a pipe laid on the ground (sea bottom or land), flexible pipe referred to as riser, i.e. at least a portion of which runs through the water depth while being subjected to dynamic stresses.

2) Definition of the specifications corresponding to a given use (for example: operating pressure, water depth, . . . ).

The second category of input parameters defines the structure elements available for this objective: body, pressure layer, hoop, armoring wires, etc.

The information concerning these two input categories is transmitted to the program, in the first case, by means of a user interface from which the conditions of use of the flexible pipe are entered and, in the second case, by making up a database file containing technical information on the various profiles and materials of the available elements.

The specifications defining the problem to be dealt with can be subdivided into several fields, certain input parameters being, moreover, optional. Furthermore, certain fixed parameters in the current version of the program can also be optimized and are asterisked (*).

a) Mechanical Parameters

Sea bottom depth,

Inside diameter of the flexible pipe,

Operating internal pressure,

Pipe setting mode: empty or full (*),

Type of effluent transported: sweet or sour,

Length of the line (flowline),

Thickness of the inner and outer sheaths (*),

Materials making up the inner and outer sheaths (*),

Density of the effluent (riser),

Offset between the foot and the head of the flexible pipe (riser).

b) Thermal Insulation Parameters:

Temperature outside the flexible pipe,

Temperature of the effluent at the wellhead outlet,

Solidification (or beginning crystallization) temperature of the effluent,

Maximum length of a production stop,

Specific heat of the effluent,

Type of insulating material.

c) Flexible Pipe Manufacturing and Laying Parameters:

Maximum weight per unit of length in the open air (handling constraints during manufacturing and/or laying), Maximum suspended weight during laying, Maximum thickness of the armors (manufacturing constraint), Maximum number of armoring wires (armoring capacities limitation), Initial out of round imperfection (manufacturing tolerance).

d) Optimization Parameters:

Accuracy of the desired armoring thickness,

Accuracy of the desired armoring angle.

e) Hybridization:

Number of segments of distinct possible structures to constitute the total length of the flexible pipe.

f) Selection from the Databases:

This option allows restriction of the formation of the combinations of constituents from the databases to certain categories of structures (for example, if only two types of technical solutions are to be compared).

The databases comprise the information required for calculations relative to each element constituting the various layers of the flexible pipe.

Figure 1B:
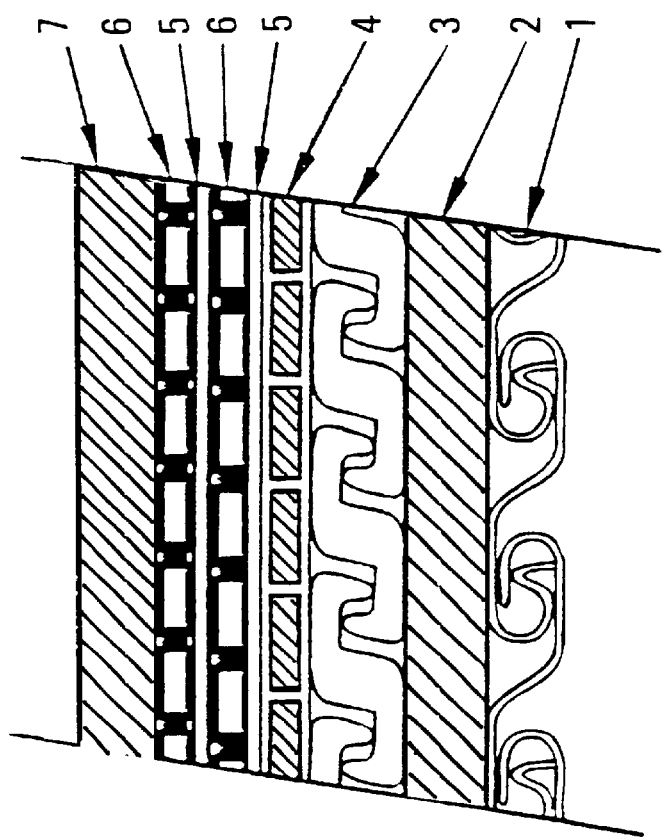
Figure 2A:
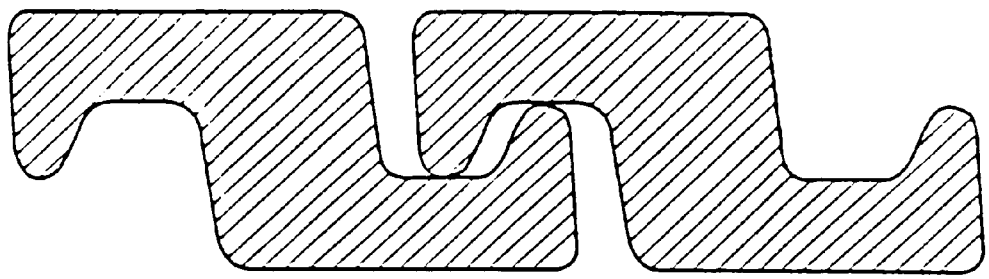
FIGS. 2a, 2b, 2c and 2d show examples of cross-sections of reinforcing wires, for the pressure layer for example.
Figure 2B:
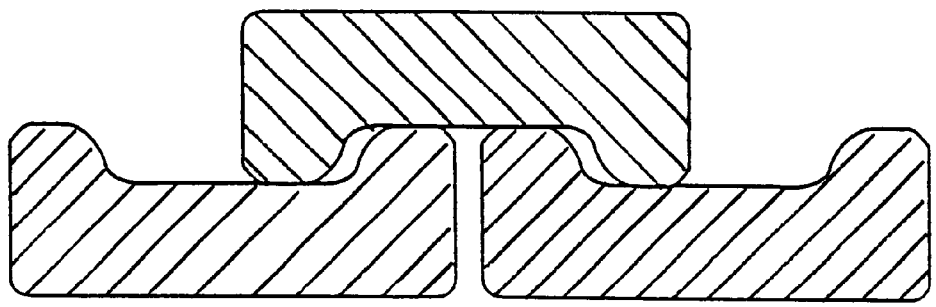
Figure 2C:
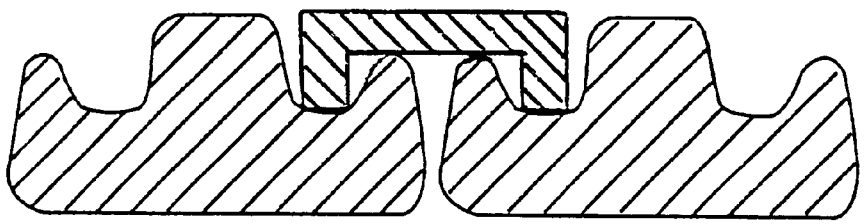
Figure 2D:
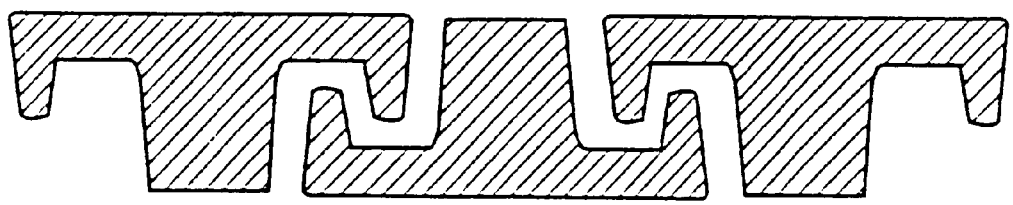

FIGS. 1a and 1b illustrate a conventional flexible pipe structure, in perspective and in cross-sectional view, in order to precisely define the constituents of a flexible pipe. Reference number 1 represents a body consisting here of an interlocked steel tape. The main function of the body is to increase the collapse strength of sheath 2 generally extruded immediately above. The body can be made in the same way as a pressure layer, i.e. with Z, T or C-shaped wires (FIGS. 2a, b, c, d), but it does not take part in the internal pressure resistance since there is no inner sealing.

Reference number 2 represents a sealing sheath, for example made of a polymer material, of corrugated metal or cylindrical. Its main function is to form a seal between the inside and the outside.

Reference number 3 relates to the pressure layer mainly intended to increase the resistance of inner sheath 2 to the internal pressure due to the effluent. The pressure layer is generally made from wire having the sections diagrammatically shown in FIGS. 2a, 2b, 2c, 2d, respectively referred to in the trade as Z, C, T/u, T/T-shaped wire.

Reference number 4 represents a hoop. A hoop is a layer of wire wound above the pressure layer in order to increase its resistance to the internal pressure. A hoop is generally not made of interlocked or self-interlocking wire. When the thickness of the pressure layer wire can be increased, the presence of a hoop is not mandatory. However, it can be advantageous to compare a solution comprising a pressure layer and a hoop with a solution comprising only a pressure layer consisting of a high-inertia pressure layer wire.

Reference number 5 represents anti-wear layers. These layers, of limited thickness, are not taken into account when determining the structure of a flexible pipe. These layers are most often made by winding of a polymer strip, adhesive or not.

Reference number 6 identifies the two tension strength armoring layers. The wires are generally not interlocked or self-interlocking. The winding angles are opposite so as to balance, as it is well-known, the behavior of the flexible pipe in torsion.

Reference number 7 shows the outer sheath.

The "Body" Database can Comprise the Following Information:

Type of section of the wire

Steel tape width

Steel tape thickness

Total thickness of the profile

Number of profiles

Winding pitch

Flexural inertia

Minimum laying diameter

Maximum laying diameter

Cross-section

Density of the material

Young's modulus

Elastic limit of the material

Maximum stress of the material under working conditions

Maximum stress of the material during installation

Ultimate limit of the material

Thermal conductivity

Heat-capacity rate Cost.

The "Pressure Layer" Database Comprises the Following Information:

Type of section of the wire

Thickness and width of the profile

Number of wires

Winding pitch

Flexural inertia

Minimum laying diameter

Maximum laying diameter

Cross-section

Density of the material

Young's modulus

Elastic limit of the material

Maximum stress of the material under working conditions

Maximum stress of the material during installation

Ultimate limit of the material

Thermal conductivity

Heat-capacity rate

Corrosion resistance

Cost.

The "hoop" database comprises the same technical information as for the pressure layer wires.

The "Sheath Material" Database Comprises:

Density

Young's modulus

Thermal conductivity

Heat-capacity rate

Cost.

The "Armoring" Database Describes:

Type of wires

Type of material

Density of the material

Young's modulus

Elastic limit of the material

Maximum stress of the material under working conditions

Maximum stress of the material during installation

Ultimate limit of the material

Thermal conductivity

Heat-capacity rate

Corrosion resistance

Cost.

The "Insulating Material" Database Comprises:

Density of the mate rial

Young's modulus

Thermal conductivity

Heat-capacity rate

Maximum depth of use

Maximum temperature of use

Cost.

Figure 3:
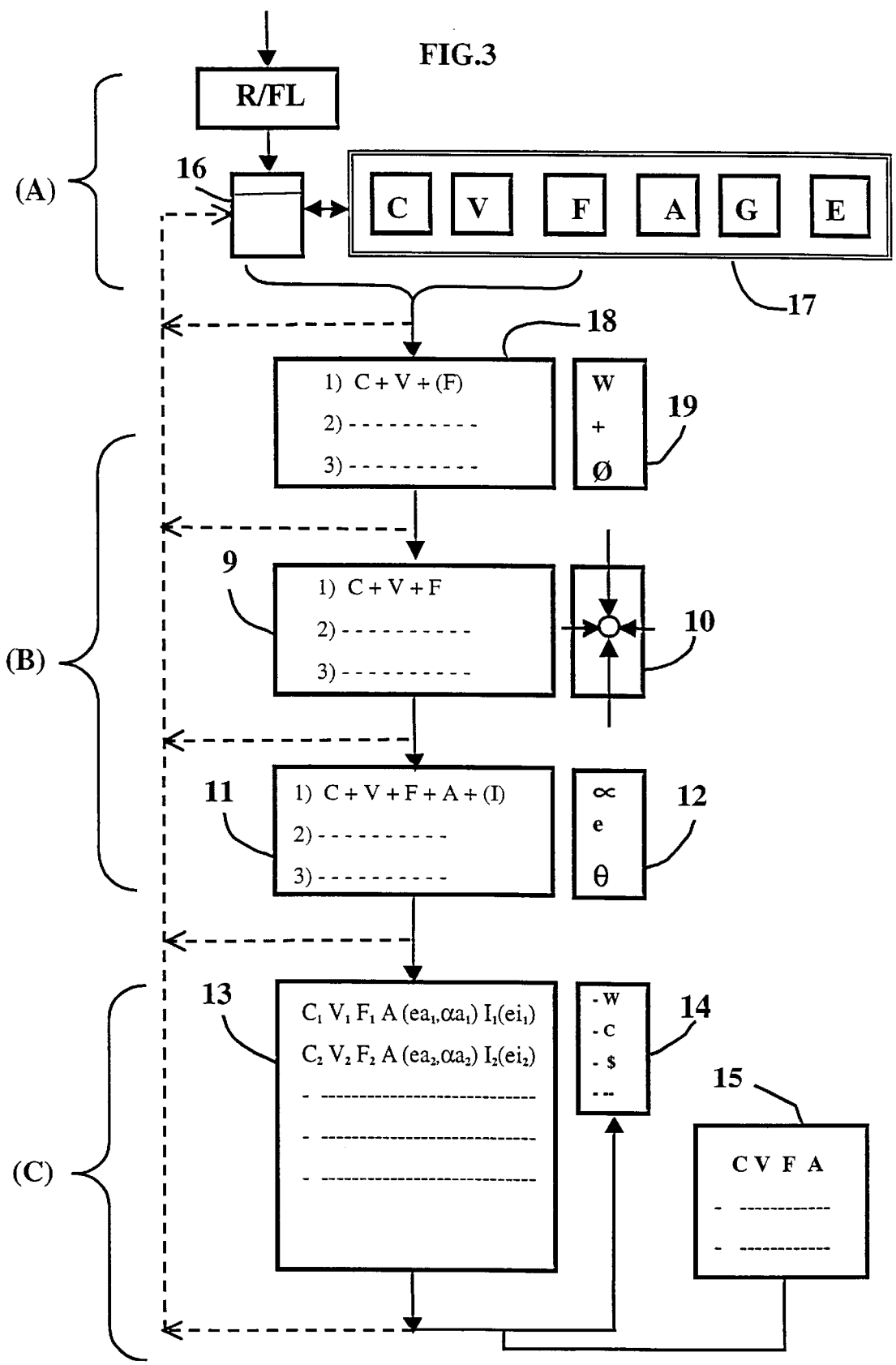
FIG. 3 illustrates an example of a flowchart according to the present method.

The method of the present invention is described hereafter by means of the flowchart illustrated in FIG. 3.

C, V, F, A, I respectively represent the following elements: Body, Pressure layer, Hoop, Armoring and Insulation. Sheaths G are taken into account in the calculations for a fixed thickness and a given material. The structures obtained do therefore not take into account the material and the thickness of a sheath as a parameter. However, it is possible to add to the present method the calculation of the optimum sheath thickness for a given structure and given specifications.

The Flowchart of FIG. 3 is Organized in Three Main Stages:

step (A) relates to: the input parameters giving information for specifications, the consultation of databases relative to the identity and to the characteristics of the constituents of a flexible pipe, optionally additional technical information to expand the bases, and generally a selection, by the operator, of certain parts of the bases, for example in order to restrict combinations;

step (B) relates to the making up of a collection of combinations of elements C, V, F, A and optionally I, considering the mechanical and thermal calculations made, to check the accordance of certain combinations with the specifications;

step (C) relates to the use of the display of combinations meeting the specifications.

The display can be organized according to selected criteria.

Step (A) starts with the input of the type of flexible pipe: riser (R) or flowline (FL). A flowline is a pipe laid on the ground, generally the sea bottom, connecting two weliheads or manifolds. This pipe, once laid, has a static behavior and it is only subjected to pressure forces. A riser runs through the water depth and connects the sea bottom to an overhead support. The riser is thus suspended and it can be subjected to displacements. Calculations are advantageously simplified if the selection of the type of operating conditions (R or FL) is made from the start.

Block 16 diagrammatically shows a page of the user interface on which the latter enters the information relative to the specifications: water depth, inside diameter, operating pressure, length of the line, maximum weight per unit of length, radius of curvature, thermal data, sourness of the ambient environment, etc.

Block 17 represents all the databases C, V, F, A, G, I, etc., defined above. The bases can be organized in subsets or categories of structures, so as to allow restriction of the number of combinations.

The general principle of the method is to perform combinations of elements C, V, F, A, G, I meeting certain criteria.

At the end of stage (A), the computer has formed a set of combinations C, V, F (a certain number without a hoop) (block 18). Inner sheath G is not mentioned here or in the description hereafter, but it is always taken into account and systematically positioned between the body and the pressure layer. One or more additional "outer") sheaths can also be placed just below the armors (i.e. above the pressure layer or the possible hoop), or above the armors, or above the insulant. Combinations which do not meet first criteria: weight in the air, weight in the water (W), are excluded from these combinations. The combinations are made from bodies that can be manufactured with the imposed inside diameter Φ. In other words, with all the bodies of database C that are in accordance, combinations are made by setting on the sealed sheath (made of metal, polymer, or another material) covering the body pressure layers from database V, then hoops from database F, it is clear that the diameters of the pressure layers and of the hoops must be compatible with those of the bodies considered. It can be noted that the primary control (block 19) suppresses all the combinations C, V, F whose weight per unit of length in the air and/or in the water is greater than the weight defined in the specifications.

The remaining combinations (block 9) are checked by calculating their collapse strength (block 10). In the present example, these calculations are conventional, for example the calculation method published by SINTEF (N-7034 Trondheim, Norway): "Handbook on Design and Operation of Flexible Pipes" 1992-ISBN No. 82-595-7266-4.

As it is well-known, it is the assembly consisting of the body, the pressure layer, possibly with a hoop, that is taken into account for the collapse strength. The conventional collapse strength calculation is made by taking account of an inner sheath. However, the calculation can also be carried out by taking account of a second, outer sheath placed above the pressure layer or possibly the hoop.

After excluding the combinations that do not withstand the required collapse conditions, an armoring material, an armoring thickness (1 mm for example) and an armoring angle are selected for each remaining combination (block 11). The armoring angle (angle of the armors in relation to the axis of the pipe) can be selected according to the conditions of use. In fact, it is well-known that the efficiency of the armors for taking up axial stresses is all the higher as the angle is small, whereas their involvement for taking up the internal pressure decreases. The flexible pipe can thus be armored with a greater angle if it is desired to relieve the pressure layer from the internal pressure.

At this point of the program, a structure of the flexible pipe is entirely defined, it is therefore possible to check (block 12) whether it meets the specifications with the thickness and the angle considered. If this is not the case, the calculation process is completed by varying the armoring angle (for example between 25 and 55 degrees), then the armoring thickness. However, as soon as a solution has been found, it is possible to decide to stop the search for the CVFAI combination found. The calculation program repeats these calculations from each combination, and for all the armoring materials of base A, for example, steel, aluminium, composite armoring made of glass fiber or carbon fiber, . . .

In cases where thermal insulation conditions are noted in the specifiations, the program determines an insulant thickness for one of the materials selected while checking that the whole structure comprising the insulant meets the specifications.

Other algorithms can also be used to optimize the structure (generally minimization of the thickness), for example a Newton (gradient) algorithm.

The search for combinations meeting the specifications is completed, the flexible pipe structures, solutions to the problem posed, are recorded in block 13. The user can then view all the structures and their details.

In order to facilitate analysis or selection of a pipe structure, the user can impose one or more classification criteria, diagrammatically represented by block 14, which allows classification according to, for example, the weight of the pipe, the greatest collapse strength, the lowest manufacturing cost (if price information is included in the databases), the outside diameter. The complete data sheet 15 of the best flexible pipe structure according to the criterion selected is directly accessible.

Of course, if, after each stage, there is no possible combination, the user must return to specifications 16 in order to modify certain parameters (diagrammatically shown by the dashed retroaction lines).

The procedure is symbolically illustrated with the following example based, in order to simplify the number of possible combinations, on a restricted database containing a body (C), two pressure layers (V1, V2), two hoops (F1, F2), two types of armoring materials (A1, A2) and an insulating material (I).

| Stages | Combinations of structures |
| --- | --- |
| All the possible combinations | CV1-CV2-CV1F1-CV1F2-CV2F1-CV2F2 |
| Remaining combinations after primary controls (19) | CV1-CV2-CV1F1-CV1F2-CV2F1 |
| Combinations after collapse strength control (10) | CV1-CV1F1-CV1F2-CV2F1 |
| Creation of combinations with armouring material and insulant type (11) | CV1A1I-CV1F1A1I-CV1F2A1I-CV2F1A1I-CV1A2I-CV1F1A2I-CV1F2A2I-CV2F1A2I |
| Optimized combinations: armouring angle, armouring and insulant thickness | CV1A1(ea1, $\alpha$a1)I(ei1)-CV1F1A1(ea2, $\alpha$e2)I(ei2)-CV1F2A1(ea3, $\alpha$a3)I(ei3)-CV1A2(ea4, $\alpha$a4)I(ei4)-CV1F1A2(ea5, $\alpha$a5)I(ei5)-CV1F2A2(ea6, $\alpha$a6)I(ei6) (*) |
| Remaining combinations after specifications control (12) | CV1A1(ea1, $\alpha$a1)I(ei1)-CV1A2(ea4, $\alpha$a4)I(ei4)-CV1F1A2(ea5, $\alpha$a5)I(ei5)-CV1F2A2(ea6, $\alpha$a6)I(ei6) |

(*)The combinations with pressure layer V2 lead to armoring or insulant thicknesses and/or armoring angles that are incompatible with the specifications.
ea1, ea2, ... represent the armoring thicknesses,
ei1, ei2, ... represent the insulant thicknesses,
$\alpha$a1, $\alpha$a2, ... represent the armoring angles of the armors.

In this purely symbolic example, it can be noted that four structures meeting the specifications are eventually obtained, each one being optimized as regards the armoring thickness (the thinnest) and the insulant thickness (the thinnest for the armoring thickness fixed) for a given C/V/F/A/I assembly. The last sorting stage thus allows to identify the best globally optimum structures in relation to the criterion selected. It can be observed that two structures with a hoop are a priori more complex structures which afford no technical advantage in relation to structures without a hoop. They however meet the specifications and could therefore be preferred if their specific mechanical and cost characteristics are interesting as regards given operating conditions.

One of the advantages of the present invention, which consists in giving all the possible solutions to a structure problem, has been described. The user is thus certain of selecting the best solution for his own criteria prioritization.

What is claimed is:

1. A method for determining a flexible pipe meeting specifications and including at least one of a body, a sealed sheath, a pressure layer, a hoop, an armoring layer and an insulating material layer, the method comprising:
   a) recording data of the specifications corresponding to conditions of use and to laying and manufacturing conditions of the pipe;
   b) providing databases related to each one of the elements of the pipe;
   c) determining all combinations of at least one of the body, the pressure layer, the hoop and the sealed sheath, defined in the databases to form partial structures at least in accordance with a geometry of the pipe defined by the specifications;
   d) eliminating any combinations which do not meet an external pressure resistance imposed by the specifications;
   e) determining for each combination meeting an external pressure resistance, a thickness and an armoring angle of armors; and
   f) classifying each combination meeting the external pressure resistance according to a determined criterion.

2. A method as claimed in claim 1, wherein a geometry of the pipe defined by the specifications in step c is an inside diameter of the pipe.

3. A method as claimed in claim 2, wherein, after step c), only combinations with a weight per unit of length in accordance with the specifications are retained.

4. A method as claimed in claim 3, wherein step e) is carried out by accounting for a calculated insulation thickness.

5. A method as claimed in claim 4, wherein step e) is carried out from all types of armoring wires selected from a database regarding armoring wires.

6. A method as claimed in claim 4, wherein the combinations are classified according to at least one of weight per unit of length, cost, outside diameter, safety coefficient at operating pressure, collapse pressure, maximum laying depth, and suspended weight when laid.

7. A method as claimed in claim 3, wherein step e) is carried out from all types of armoring wires selected from a database regarding armoring wires.

8. A method as claimed in claim 7, wherein the combinations are classified according to at least one of weight per unit of length, cost, outside diameter, safety coefficient at operating pressure, collapse pressure, maximum laying depth, and suspended weight when laid.

9. A method as claimed in claim 3, wherein the combinations are classified according to at least one of weight per unit of length, cost, outside diameter, safety coefficient at operating pressure, collapse pressure, maximum laying depth, and suspended weight when laid.

10. A method as claimed in claim 2, wherein step e) is carried out by accounting for a calculated insulation thickness.

11. A method as claimed in claim 10, wherein step e) is carried out from all types of armoring wires selected from a database regarding armoring wires.

12. A method as claimed in claim 11, wherein the combinations are classified according to at least one of weight per unit of length, cost, outside diameter, safety coefficient at operating pressure, collapse pressure, maximum laying depth, and suspended weight when laid.

13. A method as claimed in claim 10, wherein the combinations are classified according to at least one of weight per unit of length, cost, outside diameter, safety coefficient at operating pressure, collapse pressure, maximum laying depth, and suspended weight when laid.

14. A method as claimed in claim 2, wherein step e) is carried out from all types of armoring wires selected from a database regarding armoring wires.

15. A method as claimed in claim 14, wherein the combinations are classified according to at least one of weight per unit of length, cost, outside diameter, safety coefficient at operating pressure, collapse pressure, maximum laying depth, and suspended weight when laid.

16. A method as claimed in claim 2, wherein the combinations are classified according to at least one of weight per unit of length, cost, outside diameter, safety coefficient at operating pressure, collapse pressure, maximum laying depth, and suspended weight when laid.

17. A method as claimed in claim 1, wherein, after step c), only combinations with a weight per unit of length in accordance with the specifications are retained.

18. A method as claimed in claim 17, wherein step e) is carried out by accounting for a calculated insulation thickness.

19. A method as claimed in claim 18, wherein step e) is carried out from all types of armoring wires selected from a database regarding armoring wires.

20. A method as claimed in claim 19, wherein the combinations are classified according to at least one of weight per unit of length, cost, outside diameter, safety coefficient at operating pressure, collapse pressure, maximum laying depth, and suspended weight when laid.

21. A method as claimed in claim 18, wherein the combinations are classified according to at least one of weight per unit of length, cost, outside diameter, safety coefficient at operating pressure, collapse pressure, maximum laying depth, and suspended weight when laid.

22. A method as claimed in claim 17, wherein step e) is carried out from all types of armoring wires selected from a database regarding armoring wires.

23. A method as claimed in claim 22, wherein the combinations are classified according to at least one of weight per unit of length, cost, outside diameter, safety coefficient at operating pressure, collapse pressure, maximum laying depth, and suspended weight when laid.

24. A method as claimed in claim 17, wherein the combinations are classified according to at least one of weight per unit of length, cost, outside diameter, safety coefficient at operating pressure, collapse pressure, maximum laying depth, and suspended weight when laid.

25. A method as claimed in claims 1, wherein step e) is carried out by accounting for a calculated insulation thickness.

26. A method as claimed in claim 25, wherein the combinations are classified according to at least one of weight per unit of length, cost, outside diameter, safety coefficient at operating pressure, collapse pressure, maximum laying depth, and suspended weight when laid.

27. A method as claimed in claim 1, wherein step e) is carried out from all types of armoring wires selected from a database regarding armoring wires.

28. A method as claimed in claim 27, wherein the combinations are classified according to at least one of weight per unit of length, cost, outside diameter, safety coefficient at operating pressure, collapse pressure, maximum laying depth, and suspended weight when laid.

29. A method as claimed in claim 25, wherein step e) is carried out from all types of armoring wires selected from a database regarding armoring wires.

30. A method as claimed in claim 29, wherein the combinations are classified according to at least one of weight per unit of length, cost, outside diameter, safety coefficient at operating pressure, collapse pressure, maximum laying depth, and suspended weight when laid.

31. A method as claimed in claim 1, wherein the combinations are classified according to at least one of weight per unit of length, cost, outside diameter, safety coefficient at operating pressure, collapse pressure, maximum laying depth, and suspended weight when laid.

32. A method as claimed in claim 1, wherein the combinations are classified according to at least one of weight per unit of length, cost, outside diameter, safety coefficient at operating pressure, collapse pressure, maximum laying depth, and suspended weight when laid.

33. A method as claimed in claim 1, wherein the databases used in step c) are restricted to specific types of elements to limit a number of the combinations.

* * * * *